United States Patent Office 3,257,440
Patented June 21, 1966

3,257,440
BETA-CYANOETHYLPOLYSILOXANE AND PROCESS FOR PRODUCING BETA-CYANOETHYLSILANES
Victor B. Jex, Clarence, N.Y., assignor to Union Carbide and Carbon Corporation, a corporation of New York
No Drawing. Filed Dec. 23, 1955, Ser. No. 555,201
7 Claims. (Cl. 260—448.2)

This invention relates to new compositions of matter comprising the beta-cyanoethylsilanes and to a process for their production. More particularly, the invention is concerned with beta-cyanoethylsilanes which contain at least one hydrolyzable group bonded to the silicon atom thereof as new compositions of matter and to a process for their production.

In copending United States application Serial No. 555,-205 filed concurrently herewith, now abandoned, there is disclosed and claimed the process of reacting alpha-beta olefinically unsaturated nitrile of the type represented by acrylonitrile, methacrylonitrile, crotononitrile and the like with a silane containing at least one hydrogen atom and at least one hydrolyzable group bonded to the silicon atom thereof to produce a mixture of reaction products from which an alpha-cyanoalkylsilane can be recovered. The overall reaction which takes place can be graphically represented by the following equation, which depicts, for the purpose of illustration, the reaction between acrylonitrile and trichlorosilane.

$$H_2C=CH-CN + HSiCl_3 \longrightarrow \underset{\underset{SiCl_3}{|}}{\overset{\overset{H}{|}}{H_2C-CH-CN}}$$

The present invention is based on our discovery that an alpha-beta olefinically unsaturated nitrile of the type represented by acrylonitrile, methacrylonitrile, crotononitrile and the like can be caused to react with a silane, contining at least one hydrogen atom and at least one hydrolyzable group bonded to the silicon atom thereof, in the presence of a catalyst to produce a beta-cyanoalkylsilane by the addition of a silyl group to the beta carbon atom of such nitrile, that is the olefinic carbon atom further removed from the cyano group of the nitrile, and by the addition of a hydrogen atom to the alpha carbon atom of such nitrile, that is the vicinal olefinic carbon atom. Based on our discovery we have further found that any olefinic nitrile can be caused to react with a silane, containing at least one hydrogen atom and at least one hydrolyzable group bonded to the silicon atom thereof, in the presence of a catalyst to produce a cyanoalkylsilane by the addition of a silyl group to the olefinic carbon atom further removed (*) from the cyano group of the nitrile

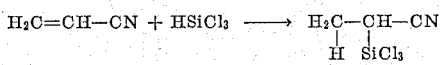

and by the addition of a hydrogen atom to the olefinic carbon atom closer to the cyano group of the nitrile. The overall reaction which takes place can be graphically represented by the following equations which depict for the purpose of illustration the reaction between acrylonitrile and trichlorosilane and the reaction between allyl cyanide and triethoxysilane:

$$H_2C=CH-CN + HSiCl_3 \xrightarrow{\text{catalyst}} \underset{\underset{H}{|}}{\overset{\overset{Cl_3Si}{|}}{H_2C-CH-CN}} \quad (1)$$

$$H_2C=CH-CH_2-CN + HSi(OEt)_3 \xrightarrow{\text{catalyst}} \underset{\underset{H}{|}}{\overset{\overset{(EtO)_3Si}{|}}{H_2C-CH-CH_2-CN}} \quad (2)$$

Our process can be carried out by forming a mixture of the olefinic nitrile, a silane containing at least one hydrogen atom and at least one hydrolyzable group bonded to the silicon atom thereof and a small or catalytic amount of a hydrocarbyl substituted hydride of an element taken from Group VB of the long form of the Periodic Table as catalyst for the reaction and heating the mixture to a temperature sufficiently elevated to cause the starting materials to react. There results or is produced a cyanoalkylsilane by the addition of a silyl group to the olefinic carbon atom of the nitrile further removed from the cyano group and by the addition of a hydrogen atom to the olefinic carbon atom of the nitrile closer to the cyano group.

The silane starting materials containing at least one hydrogen atom and at least one hydrolyzable group bonded to the silicon atom thereof, which we employ in our process can be graphically represented by the following general formula:

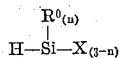

wherein $R^0$ represents a hydrogen atom of a hydrocarbyl group, preferably a saturated aliphatic hydrocarbyl group as for example, an alkyl group such as methyl, ethyl, propyl, butyl, pentyl and the like; a cycloalkyl group such as cyclopentyl, cyclohexyl, methylcyclopentyl, ethylcyclohexyl, and the like or an aryl group such as phenyl, naphthyl, tolyl, methylnaphthyl and the like, X is a hydrolyzable group such as a halogen atom, preferably a chlorine atom, or a hydrocarbyloxy group, preferably an alkoxy or an aryloxy group such as methoxy, ethoxy, propoxy, phenoxy and the like, and $n$ is a whole number having a value of from 0 to 2. Illustrative of the silane starting materials are trichlorosilane, triethoxysilane, dichlorosilane, diethoxysilane, monochlorosilane, monoethoxysilane, methyldichlorosilane, ethyldiethoxysilane, diethylethoxysilane, dimethylchlorosilane, butylethylchlorosilane, phenyldichlorosilane, phenylethylethoxysilane, dipropylphenoxysilane and the like.

The olefinic nitrile starting materials we can employ in the practice of our invention are the aliphatic mono-olefinic nitriles which contain from three to ten carbon atoms to the molecule. Illustrative of such olefinic nitriles are acrylonitrile, methacrylonitrile, allyl cyanide, 1-cyano-3-butene, 1-cyano-4-pentene, 1-cyano-1-hexene and the like. Our preferred nitrile starting materials are the alpha-beta olefinically unsaturated nitriles, namely those nitriles in which the unsaturated grouping

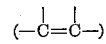

is directly bonded, through one of the carbon atoms thereof, to the carbon atom of the cyano group. Such olefinic nitriles are commonly known as the vinyl-type cyanides and can be represented graphically by the general formula:

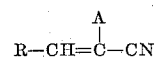

where R can be a hydrogen atom of an alkyl group as for example methyl, ethyl, propyl, butyl and the like and A is either a hydrogen atom or a methyl group. Illustrative of such vinyl-type cyanides are acrylonitrile, methacrylonitrile, crotononitrile and the like.

The hydrocarbyl substituted hydrides of the elements of Group VB of the long form of the Periodic Table which we employ as catalysts in our process direct the addition of the silyl group of our starting silane to the olefinic carbon atom of our starting nitrile further removed from the cyano group thereof and the addition of the hydrogen atom of the starting silane to the vicinal olefinic carbon atom. Such catalysts are the tri-hydrocarbyl substituted hydrides of such elements which can be graphically represented by the formula:

wherein R′, R″ and R‴ represent hydrocarbyl groups, as for example alkyl or aryl groups, which need not be necessarily the same. Illustrative of such alkyl groups are methyl, ethyl, propyl, isopropyl, butyl, isobutyl, pentyl and the like; while illustrative aryl groups are phenyl, tolyl, naphthyl and the like. The letter E represents an element taken from Group VB of the Periodic Table as for example either nitrogen, phosphorus, arsenic, antimony or bismuth. Illustrative of such substituted hydrides are: trimethylamine, triethylamine, triphenylamine, triethylarsine, triphenylarsine, triethylphosphine, diethylmethylphosphine, tri-n-butylphosphine, triphenylphosphine, triethylstibine, triphenylstibine, triphenylbismuthine and the like.

We have found that the amount of the catalyst employed in our process is not narrowly critical. Thus, amounts of the tri-hydrocarbyl substituted hydrides of the elements of Group VB of the Periodic Table of from as little as about 0.2 part to as much as about 10 parts by weight per 100 parts of the total weight of the starting materials can be favorably employed. We preferably employ the catalyst in an amount of from about 0.3 part to about 3 parts by weight per 100 parts of the total weight of the nitrile and silane starting materials. Amounts of the trihydrocarbyl substituted catalysts in smaller or greater quantities than the favorable range can also be employed. However, no commensurate advantage is obtained thereby.

The olefinic nitrile and silane starting materials can be employed in our process in amounts which can vary from about one-half to 2 moles of the nitrile per mole of the silane. Preferably, the reactants are employed in equimolar amounts. Amounts of either of the starting materials in excess of the ratios set forth above can also be employed; however, no commensurate advantage is obtained thereby.

To facilitate observation and at the same time to favor closer control of the reaction conditions, most of our experimental work was carried out in pressure vessels or bombs, with agitation being provided if desired by continuous shaking. Similar results can be obtained with flowing reactants in apparatus of known design permitting the maintenance of a closed system. In the reactions with which our invention is concerned, it is desirable to maintain sufficiently high concentrations of the reactants (as measured for example in moles per liter of reaction space) to promote effective contact between the molecules to be reacted. When one of the reactants is a gas, or a liquid readily volatile at the reaction temperature, and the reaction mixture is permitted to expand freely on heating, the concentration of that reactant will fall to a low value thus considerably slowing the reaction rate. If, however, the reactants are charged to a closed vessel which is sealed before heating, the initial concentration of any reactant falls off through its consumption by the reaction. If a reactant is a gas, it may be desirable to charge the reaction vessel to a considerable pressure to secure an adequate concentration and reaction rate, and also to supply enough of the reactant to produce an acceptable quantity of the product.

The temperatures which can be employed in carrying out our process are not narrowly critical and can vary over a wide range. For example, temperatures as low as 40° C. and as high as 350° C. can be advantageously employed. When conducting the process of the invention in a closed vessel a temperature in the range of from about 75° C. to about 250° C. is preferred. Under such conditions, a reaction period of from about two to about five hours is suitable. Temperatures of from about 175° C. to about 300° C. are preferred when conducting the process in apparatus which provides for the flow of the reactants and products while maintaining the conditions of a closed system. In such systems, where the pressure may range from atmospheric up to 4000 pounds per square inch and higher, the time required for the reaction to take place can be as short as 0.005 minute.

In carrying out the process of our invention the product initially obtained comprises a mixture of compounds including the main cyanoalkylsilane as well as some unreacted nitrile and unreacted silane starting compounds. The cyanoalkylsilane product, formed by the addition of a silyl group to the olefinic carbon atom of the nitrile further removed from the cyano group and by the addition of a hydrogen atom to the olefinic carbon atom closer to the cyano group, which contains at least one hydrolyzable group bonded to the silicon atom thereof, as for example beta-cyanoethyltrichlorosilane, can be recovered therefrom by distillation which is preferably conducted under reduced pressure.

The mechanism of our overall reaction wherein the silyl group is attached to the olefinic carbon atom of the starting nitrile further removed from the cyano group and the hydrogen atom is attached to the olefinic carbon atom closer to the cyano group with the apparent suppression of other addition or reaction products is not known with certainty or fully understood. It is known that upon heating our reactants in the absence of a tri-hydrocarbyl substituted hydride of an element of Group VB as catalyst other reactions take place such as: the formation of both silicon- and non-silicon-containing free radicals and complexes, the homopolymerization of the starting nitrile, and even the disproportionation of the starting silane has been observed. In addition, it is known that in the absence of our catalysts, our preferred starting materials can react to produce a mixture from which an alpha-cyanoalkylsilane, wherein the silyl group is attached to the olefinic carbon closer to the cyano group and the hydrogen atom is attached to the other olefinic carbon more remote from cyano group, can be recovered with no beta addition products being detected. One possible explanation for the course which our reaction follows when a silane and an olefinic nitrile react in the instance where the nitrile is a vinyl-type cyanide is that the addition of the silyl group to the olefinic carbon atom more removed from the cyano group of the nitrile occurs through an ionic mechanism while the addition of the silyl group to the olefinic carbon atom closer to the cyano group of the nitrile occurs through a free radical mechanism. If such is the case, then the activation energy required for the reaction, between our starting nitriles and silanes, to proceed by a free radical mechanism is considerably less than that required to cause the reaction to proceed by an ionic mechanism. Consequently in the absence of our catalyst the reaction between an olefinic nitrile and a silane, as for example acrylonitrile and trichlorosilane will produce the alpha-addition product namely, alpha-cyanoethyltrichlorosilane. On the other hand, our tri-hydrocarbyl substituted hydride catalysts apparently have the effect of markedly decreasing the activation energy required for the reaction to proceed by an ionic mechanism and therefore when employed in such reactions, as for example in the above acrylonitrile-trichlorosilane reaction, result in the production of beta-cyanoethyltrichlorosilane.

When the olefinic nitrile is of the type represented by allyl cyanide, that is where the unsaturated grouping

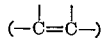

is removed by one or more carbon atoms from the cyano group, our catalyst also functions in promoting the reaction thereof with our silane starting materials to produce addition products by the addition of a silyl group to the olefinic carbon atom more removed from the cyano group, and by the addition of a hydrogen atom to the olefinic carbon closer to the cyano group. By way of illustration, gamma-cyanopropyltrichlorosilane is prepared by reacting allyl cyanide with trichlorosilane in accordance with the subject process.

Bis(cyanoalkyl)silanes are produced in the practice of the process of our invention when our starting nitriles are reacted with silanes containing at least two hydrogen atoms bonded to the silicon atom thereof. In such instances the nitrile starting material is preferably employed in an amount which is at least twice the number of moles of the starting silane. Along with the desired bis compound, there is present in the reaction mixture the cyanoalkyl hydrogensilane. By way of illustration, when two moles of acrylonitrile are reacted with one mole of dichlorosilane in the presence of our tri-hydrocarbyl substituted hydrides there is obtained, bis(beta-cyanoethyl)dichlorosilane and beta-cyanoethylhydrogendichlorosilane. Still in accordance with our invention, the tris compounds can also be obtained by using as the starting material a silane containing at least three hydrogen atoms bonded to the silicon atom thereof.

Our beta-cyanoethylsilanes can be graphically depicted by the following general formula:

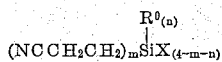

$$(NCCH_2CH_2)_m \overset{R^0{}_{(n)}}{\underset{|}{Si}} X_{(4-m-n)}$$

where $R^0$ represents a hydrogen atom or a hydrocarbyl group, preferably a saturated aliphatic hydrocarbyl group as for example, an alkyl group, such as methyl, ethyl, propyl, butyl, pentyl and the like; a cycloalkyl group such as cyclopentyl, cyclohexyl, methylcyclopentyl, ethylcyclohexyl, and the like or an aryl group such as naphthyl, tolyl, methylnaphthyl and the like, X is a hydrolyzable group such as a halogen atom, preferably a chlorine atom or a hydrocarbyloxy group, preferably an alkoxy or an aryloxy group such as methoxy, ethoxy, propoxy, phenoxy and the like, $m$ is a whole number having a value of from 1 to 3 and $n$ is a whole number having a value of from 0 to 2, with the sum of $m$ and $n$ being not greater than 3.

Illustrative of such new cyanoalkylsilanes are

Beta-cyanoethyltrichlorosilane,
Beta-cyanoethyltriethoxysilane,
Beta-cyanoethylmethyldichlorosilane,
Beta-cyanoethylmethyldiethoxysilane,
Beta-cyanoethylethyldichlorosilane,
Beta-cyanoethylethyldipropoxysilane,
Beta-cyanoethylhydrogendichlorosilane,
Beta-cyanoethylhydrogendiethoxysilane,
Beta-cyanoethylphenyldichlorosilane,
Beta-cyanoethylphenyldipropoxysilane,
Beta-cyanoethyldimethylchlorosilane,
Beta-cyanoethyldiphenylchlorosilane,
Beta-cyanoethylmethylhydrogenchlorosilane,
Beta-cyanoethylphenylhydrogenchlorosilane,
Beta-cyanoethyldiphenylethoxysilane,
Beta-cyanoethylmethylhydrogenethoxysilane,
Beta-cyanoethylphenylhydrogenethoxysilane,
Bis(beta-cyanoethyl)diethoxysilane,
Bis(beta-cyanoethyl)dichlorosilane,
Bis(beta-cyanoethyl)methylethoxysilane,
Bis(beta-cyanoethyl)phenylchlorosilane,
Bis(beta-cyanoethyl)hydrogenchlorosilane,
Tris(beta-cyanoethyl)chlorosilane,
Tris(beta-cyanoethyl)ethoxysilane
and the like.

Our beta-cyanoethylsilanes lend themselves to a wide variety of commercial applications. By way of illustration, the beta-cyanoethylhydrocarbyloxysilanes, as for example beta-cyanoethyltriethoxysilane, can be employed as the starting material in the preparation of the corresponding gamma - aminopropylhydrocarbyloxysilanes, as for example gamma - aminopropyltriethoxysilane, which latter compounds have been found extremely useful as sizes for fibrous glass materials when employed in combination with epoxy, phenolic and melamine condensation resins for the production of fibrous glass laminates. The production of aminopropylhydrocarbyloxysilanes is accomplished by hydrogenating the new compounds of the present invention under pressure and in the presence of a catalyst at a temperature of about 100° C. The reaction that takes place can be depicted by the following equation which illustrates the hydrogenation of beta-cyanoethyltriethoxysilane:

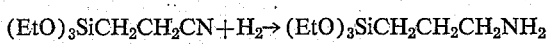

$$(EtO)_3SiCH_2CH_2CN + H_2 \rightarrow (EtO)_3SiCH_2CH_2CH_2NH_2$$

The gamma-aminopropylalkoxysilanes produced by the hydrogenation of our compounds and the use of such silanes as sizes have been disclosed and claimed in copending United States applications Serial Nos. 483,421, now Patent No. 2,832,754, and 483,423, now abandoned, both filed January 21, 1955. The process for hydrogenating the beta-cyanoethylalkoxysilanes of our invention to produce the corresponding aminopropylsilanes is disclosed and claimed in copending application Serial No. 615,466 filed October 12, 1956, now U.S. Patent 2,930,809.

The beta-cyanoethylchlorosilanes of our invention can be employed as the starting materials in the preparation of their corresponding beta-cyanoethylhydrocarbyloxysilanes by reacting such materials with an alcohol. By way of illustration, beta-cyanoethyltriethoxysilane is produced by reaction of beta-cyanoethyltrichlorosilane with ethanol. Such is accomplished by the steps of forming a reactive mixture of beta-cyanoethyltrichlorosilane and ethanol, with or without a solvent for the silane.

Our beta-cyanoethylsilanes, by virtue of the hydrolyzable group or groups bonded to the silicon atom thereof, can be hydrolyzed to beta-cyanoethylpolysiloxanes. Hydrolysis of our silanes is accomplished by the addition of such silanes to water. We prefer to carry out the hydrolysis reaction by first mixing the substituted silane with a liquid organic compound completely miscible therewith, as for example, diethyl ether and adding such mixture to a medium comprising a mixture of water, ice and the organic ether. By way of illustration, beta-cyanoethylpolysiloxane is produced by forming a mixture of beta-cyanoethyltrichlorosilane with diethyl ether, as for example, 100 parts of the silane and 20 parts of the ether and adding the mixture to a beaker containing a mixture of water, ice and diethyl ether. There results a two-phase system, one of the phases being aqueous hydrochloric acid and the other phase being beta-cyanoethylpolysiloxane in diethyl ether. The aqueous hydrochloric acid phase is decanted and the siloxane-solvent phase washed with water until the washings are neutral. Upon evaporation of the ether or other solvent from the non-aqueous phase, preferably under reduced pressure there is obtained as a residue a partially condensed beta-cyanoethylpolysiloxane. The partially condensed material can be completely cured to a hard brittle polymer. In a like manner, the difunctional beta-cyanoethylsilanes as well as the monofunctional beta-cyanoethylsilanes can be hydrolyzed to polymeric compositions.

Beta-cyanoethylpolysiloxanes, prepared by the hydrolysis of the compounds of our invention, can be graphically depicted by various general formulae depending upon the functionality of the starting monomer. By way of illustration, our trifunctional silanes upon hydrolysis become polysiloxanes containing the unit:

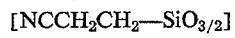

$$[NCCH_2CH_2-SiO_{3/2}]$$

which, when in a completely condensed state are represented by the formula:

$$[NCCH_2CH_2SiO_{3/2}]_w$$

and our difunctional silanes upon hydrolysis become polysiloxanes containing either unit:

or the unit

[(NCCH$_2$CH$_2$)$_2$SiO]

which when in a completely condensed state are represented by the formula:

and

[(NCCH$_2$CH$_2$)$_2$SiO]$_y$ while our monofunctional silanes upon hydrolysis become polysiloxanes containing any of the units:

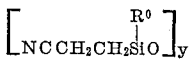

[(NCCH$_2$CH$_2$)$_3$SiO]

which, when in a completely condensed state are represented by the formula:

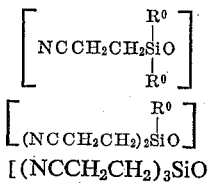

[(NCCH$_2$CH$_2$)$_3$SiO$_{1/2}$]$_2$

In the above formulae R⁰ represents a hydrogen atom or a hydrocarbyl group such as an alkyl or aryl group while the letters $w$ and $y$ represent whole numbers with $w$ having a value or at least 4 and $y$ having a value of at least 3.

The difunctional beta-cyanoethylsilanes of our invention form cyclic as well as linear polymers upon hydrolysis. For example, beta-cyanoethylmethyldiethoxysilane upon hydrolysis produces in addition to a linear beta-cyanoethylmethylpolysiloxane various cyclic siloxanes such as the cyclic trimer, tetramer, pentamer and hexamer of beta-cyanoethylmethylsiloxane. The new polymeric beta-cyanoalkylsiloxanes of our invention find use in numerous applications depending upon the type of polymers prepared. By way of illustration, the trifunctional substituted silanes upon hydrolysis and complete condensation become highly cross-linked, hard, infusible polymers. Such polymers are useful as protective coatings for metallic surfaces which are normally subjected to temperatures as high as 200° C. The new linear and cyclic siloxanes find use as oils in the lubrication of moving metal surfaces. The new monofunctional silanes as well as their hydrolysis products, namely the corresponding dimers, can be employed as endblocking compounds to control the chain length of linear beta-cyanoalkylsilanes in the production of oils.

The following examples are illustrative of the present invention.

*Example I*

To a 50 cc. steel pressure vessel were added 0.15 mole (20.3 grams) of trichlorosilane, 0.15 mole (8 grams) of acrylonitrile and 0.56 gram (2 percent by weight of triphenylphosphine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 15.85 grams of beta-cyanoethyltrichlorosilane boiling at a temperature of 75 to 85° C. under a reduced pressure of 5 to 7 mm. Hg. Beta-cyanoethyltrichlorosilane was identified by infrared analysis and by analysis for hydrolyzable chlorine (obtained 56.0 percent by weight, theory 56.4 percent by weight). Alpha-cyanoethyltrichlorosilane was not produced by the reaction. The 15.85 grams of beta-cyanoethyltrichlorosilane represented a yield of 56.0 percent base on the total number of moles of the starting materials.

*Example II*

To a 300 cc. steel pressure vessel were added 0.9 mole (120.5 grams) of trichlorosilane, 0.9 mole (48.0 grams) of acrylonitrile and 3.36 grams (2 percent by weight) of triphenylphosphine. The vessel was sealed and heated, while being rocked, to a temperature of 100° C. for a period of one-half hour. After heating the vessel was cooled to room temperature, the product removed therefrom and placed in a flask connected to a distillation column. The contents of the flask were heated to its boiling temperature under reduced pressure and there was obtained 111.2 grams of beta-cyanoethyltrichlorosilane boiling at a temperature of 75 to 80° C. under a reduced pressure 5 of 7 mm. Hg. Beta-cyanoethyltrichlorosilane was identified by infra-red analysis and by analysis for hydrolyzable chlorine (obtained 55.9 percent by weight, theory 56.4 percent by weight). Alpha-cyanoethyltrichlorosilane was not produced by the reaction. The 111.2 yield of 66 percent base on the total number of moles of the starting materials.

*Example III*

Following the procedure disclosed in Example I equal molar amounts of trichlorosilane and acrylonitrile and 1 percent by weight of the reactants of triphenylphosphine were heated in a steel pressure vessel at a temperature of 75° C. for a period of two hours. The product was fractionally distilled and obtained an amount of beta-cyanoethyltrichlorosilane equivalent to a yield of 12.7 percent by weight of the starting materials.

*Example IV*

To each of three steel pressure vessels were added equal molar amounts of trichlorosilane and acrylonitrile and 0.5, 1.0 and 2.0 percent by weight of the reactants respectively of triphenylphosphine. The vessels were sealed and heated to a temperature of 150° C. for a period of two hours. After heating the vessels were cooled and the product obtained from each of the vessels fractionally distilled. A yield of 59 percent based on the total number of moles of starting material of beta-cyanoethyltrichlorosilane was obtained from the reaction conducted in the presence of 0.5 percent of the catalyst and a yield of 67.2 percent based on the total number of moles of starting materials of beta-cyanoethyltrichlorosilane obtained from the reaction conducted in the presence of 1.0 percent of the catalyst while a yield of 65.3 percent based on the total number of moles of starting materials of beta-cyanoethyltrichlorosilane obtained from the reaction conducted in the presence of 2 percent of the catalyst.

*Example V*

Following the procedure disclosed in Example IV equimolar amounts of acrylonitrile, trichlorosilane and 2 percent by weight thereof of triphenylphosphine were heated, in separate pressure vessels, to a temperature of 40° C. for a period of 18 hours, 50° C. for a period of 20 hours and 60° C. for a period of 26 hours. Based on the total number of moles of starting materials, beta-cyanoethyltrichlorosilane was obtained in an amount of 7.9 percent frod the reaction condocted at 40° C., 23.8 percent from the reaction conducted at 50° C. and 66.5 percent from the reaction conducted at 60° C.

Example VI

To illustrate the continuous production of cyanoalkylsilanes of the process of our invention the following experiment was conducted.

To an eight gallon stainless steel feed vessel were charged equal molar amounts of trichlorosilane, acrylonitrile and 1 percent by weight thereof of triphenylphosphine. The contents of the vessel were fed to a pump which in turn fed them to a reactor positioned within an electrically heated salt bath. The reactor consisted of four vertical five foot lengths of stainless steel tubing (½″ O.D. by ¼″ I.D.) welded into top and bottom headers. The pressure within the reactor is controlled by an automatic back pressure valve operated by an air controller. The stream of beta-cyanoethyltrichlorosilane from the reactor was directed to a refrigerated product collector and phase separator from which it was periodically removed and analyzed. The continuous reaction was conducted for periods of time under various conditions of temperature and pressure with the percent conversion and efficiency of the reaction calculated for each of the periods. The values obtained appear in the table below.

| Temp. (° C.) | Pressure (p.s.i.) | Conversion to Beta-cyanoethyl-trichloro-silane (percent) | Efficiency (based on $HSiCl_3$) (percent) |
| --- | --- | --- | --- |
| 175–179 | 1,500 | 60.0 | 73.2 |
| 208–225 | 2,000 | 73.8 | 76.1 |
| 230–231 | 3,000 | 78.2 | 79.2 |
| 223 | 4,000 | 70.9 | 74.9 |

Example VII

To a 500 ml. flask equipped with a condenser, a mechanical stirrer, and dropping funnel was added a solution comprising 0.20 mole (36.4 grams) of beta-cyanoethyltrichlorosilane dissolved in 75 ml. of anhydrous ethyl ether. While stirring the mixture, 0.58 mole (26.7 grams) of ethanol was slowly added by means of the dropping funnel. After the addition, the mixture was continually stirred for about three hours after which time it was heated to its boiling temperature under reduced pressure. There was obtained 24.2 grams of beta-cyanoethyltriethoxysilane boiling at 102° C. under a reduced pressure of 3.8 mm. Hg. Beta-cyanoethyltriethoxysilane has a density $d_4^{25}$ of 0.970 and a refractive index $n_D^{25}$ of 1.4153. Elemental analyses for carbon, hydrogen, silicon, nitrogen and ethoxy content were also conducted with the values obtained listed in the table below where they are compared with the corresponding calculated values for beta-cyanoethyltriethoxysilane:

| | Beta-cyanoethyltri-ethoxysilane | |
| --- | --- | --- |
| | Found | Calculated |
| Carbon, percent by weight | 49.5 | 49.74 |
| Hydrogen, percent by weight | 8.7 | 8.81 |
| Silicon, percent by weight | 11.8 | 12.91 |
| Nitrogen, percent by weight | 6.1 | 6.45 |
| Ethoxy, percent by weight | 62.4 | 62.21 |

Example VIII

To a 300 cc. steel pressure vessel were added 0.58 mole (39 grams) of methacrylonitrile, 0.58 mole (78 grams) of trichlorosilane and 2 percent by weight of the reactants of triphenylphosphine. The vessel was sealed and heated to a temperature of 150° C. for a period of two hours. The product obtained, which was light green in color, was placed in a 250 ml. distilling flask and fractionally distilled under a reduced pressure through a Vigreux column. There was obtained 41.4 grams of beta-cyanopropyltrichlorosilane boiling at a temperature of 74 to 77° C. under a reduced pressure of 3 mm. Hg. Beta-cyanopropyltrichlorosilane has a refractive index $n_D^{25}$ of 1.4583 and a density $d_4^{25}$ of 1.28. Beta-cyanopropyltrichlorosilane was identified by infra-red analysis as well as by analysis for hydrolyzable chlorine (obtained 51.8 percent by weight, theory 52.5 percent by weight).

Example IX

To a 300 cc. steel pressure vessel were added 0.78 mole (89.7 grams) of methyldichlorosilane, 0.78 mole (41.5 grams) of acrylonitrile and 2 percent by weight of the reactants of triphenylphosphine. The vessel was sealed and heated, while being rocked, to a temperature of 150° C. for a period of two hours. After heating the vessel was cooled to room temperature, the product removed therefrom and placed in a flask connected to a distillation column. The contents of the flask were heated to its boiling temperature under reduced pressure and there was obtained 11.6 grams of beta-cyanoethylmethyldichlorosilane boiling at a temperature of 45 to 55° C. under a reduced pressure of 2 mm. Hg. Beta-cyanoethylmethyldichlorosilane was identified by infra-red analysis.

Example X

Following the procedure set forth in Example IX, 0.46 mole (59 grams) of methyldiethoxysilane, 0.46 mole (25 grams) of acrylonitrile, and 2 percent by weight of the reactants of triphenylphosphine were heated in a pressure vessel at a temperature of 200° C. for a period of five hours. The product was placed in a flask connected to a fractionating column and heated to its boiling temperature under a reduced pressure. There was obtained 1 gram of beta-cyanoethylmethyldiethoxysilane which was clear yellow in color.

Example XI

Following the procedure disclosed in Example VI, 0.9 mole (116.1 grams) of ethyldichlorosilane, 0.9 mole (48 grams) of acrylonitrile and 2 percent by weight of the reactants of triphenylphosphine were heated in a pressure vessel at a temperature of 150° C. for a period of two hours. The product obtained was placed in a flask connected to a fractionating column and heated to its boiling temperature under reduced pressure. There was obtained 23.2 grams of beta-cyanoethylethyldichlorosilane boiling at a temperature of 50 to 60° C. under a reduced pressure of 1 mm. Hg. Beta-cyanoethylethyldichlorosilane was also identified by infra-red analysis.

Example XII

To a 300 cc. steel pressure vessel were added 0.3 mole (53.6 grams) of phenyldichlorosilane and 0.3 mole (16 grams) of acrylonitrile and 2 percent by weight of the reactants of triethylamine. The vessel was sealed and heated, while being rocked, at a temperature of 150° C. for a period of five hours. The product obtained, which was a dark brown liquid, was fractionally distilled under reduced pressure. There was obtained 15.7 grams of beta-cyanoethylphenyldichlorosilane boiling at a temperature of 96° C. under a reduced pressure of 2 mm. Hg. Beta-cyanoethylphenyldichlorosilane was identified by infra-red analysis and by analysis for hydrolyzable chlorine (obtained 30.2 percent by weight, theory 30.8 percent by weight).

Example XIII

To a 300 cc. steel pressure vessel were added 0.75 mole (40 grams) of acrylonitrile, 0.19 mole (26 grams) of trichlorosilane, 0.75 mole (76 grams) of dichlorosilane and 2 percent by weight of the reactants of triphenylphosphine. The vessel was sealed and heated, while being rocked, to a temperature of 100° C. for a period of two hours. The product obtained was placed in a flask connected to a distillation column and heated to its boiling temperature under a reduced pressure. There was obtained 14.4 grams of beta-cyanoethyldichlorosilane boiling at a temperature of 50 to 52° C. under a reduced pressure of 2 mm. Hg. Beta-cyanoethyldichlorosilane was identified by infra-red analysis and by analysis for hydrolyzable chlorine (obtained 47.9 percent by weight, theory 46.0 percent by weight). The presence of a silicon to hydrogen bond in beta-cyanoethyldichlorosilane was also proven by the evolution of hydrogen when the compound was added to an alcoholic caustic solution.

*Example XIV*

To a 300 cc. steel pressure vessel were added 0.9 mole (102 grams) of methyldichlorosilane, 0.9 mole (48 grams) of acrylonitrile and 2 percent by weight of the reactants of triphenylphosphine. The vessel was sealed and heated, while being rocked, to a temperature of 150° C. for a period of five hours. The product obtained was placed in a flask connected to a fractionating column and heated to its boiling temperature. Beta-cyanoethylmethyldichlorosilane was obtained as a constant boiling product. There was also obtained a fraction identified as methyltrichlorosilane and a higher fraction (5.34 grams) boiling at 85 to 110° C. under a reduced pressure of 2 mm. Hg. This high boiling product was identified as bis-(cyanoethyl)methylchlorosilane by infra-red analysis and by analysis for hydrolyzable chlorine (obtained 18.3 percent by weight, theory 18.9 percent by weight). Bis-(cyanoethyl)methylchlorosilane is believed produced by the following reaction mechanism:

$$2MeSiHCl_2 \rightleftharpoons MeSiH_2Cl + MeSiCl_3$$

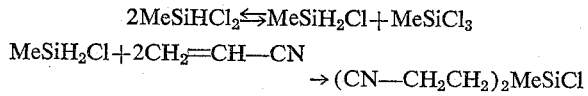

*Example XV*

Following the procedure disclosed in Example I, 0.15 mole (20.3 grams) of trichlorosilane, 0.15 mole (8 grams) of acrylonitrile and 2 percent by weight of tri-n-butylphosphine were heated in a rocking pressure vessel to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 15.83 grams of beta-cyanoethyltrichlorosilane boiling at a temperature of 75 to 85° C. under a reduced pressure of 5 to 7 mm. Hg.

*Example XVI*

To a 300 cc. steel pressure vessel were added 0.9 mole (47.8 grams) of acrylonitrile, 0.9 mole (121.9 grams) of trichlorosilane and 2.3 percent by weight of the reactants of triethylphosphine. The vessel was sealed and heated to a temperature of 150° C. for a period of two hours. After heating the vessel was cooled to room temperature, the product removed therefrom and placed in a flask connected to a distillation column. The contents of the flask were heated to its boiling temperature under a reduced pressure and there was distilled 93.2 grams of beta-cyanoethyltrichlorosilane.

*Example XVII*

To a 50 cc. steel pressure vessel were added 0.15 mole (20.3 grams) of trichlorosilane, 0.15 mole (8 grams) of acrylonitrile and 0.56 grams (2 percent by weight) of triethylamine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 7.74 grams of beta-cyanoethyltrichlorosilane boiling at a temperature of 75 to 85° C. under a reduced pressure of 5 to 7 mm. Hg.

*Example XVIII*

To a 50 cc. steel pressure vessel were added 0.15 mole (20.3 grams) of trichlorosilane, 0.15 mole (8 grams) of acrylonitrile and 0.56 gram (2 percent by weight) of triphenylarsine. The vessel was sealed and heated, while being rocked, to a temperature of 200° C. for a period of two hours. After heating, the vessel was cooled to room temperature, the product removed therefrom and placed in a flask connected to a distillation column. The contents of the flask were heated to its boiling temperature under reduced pressure and there was obtained 7.31 grams of beta-cyanoethyltrichlorosilane boiling at a temperature of 75 to 85° C. under a reduced pressure of 5 to 7 mm. Hg.

*Example XIX*

To a 300 cc. stainless steel pressure vessel was charged 0.9 mole (60.4 grams) of allyl cyanide, 0.9 mole (121.9 grams) of trichlorosilane and 2 percent by weight of the reactants of triphenylphosphine. The vessel was sealed and heated, while being rocked, to a temperature of 150° C. for a period of two hours. After heating the vessel was cooled to room temperature, the product removed therefrom and placed in a flask connected to a distillation column. The contents of the flask were heated to its boiling temperature under reduced pressure and there was obtained 56.89 grams of gamma-cyanopropyltrichlorosilane boiling at a temperature of 55–65° C. under a reduced pressure of 5 to 7 mm. Hg.

*Example XX*

To a one liter flask equipped with stirrer and reflux condenser were charged 100 cc. of a 3 percent water solution of sodium hydroxide and 187 grams (1 mole) of beta-cyanoethylmethyldiethoxysilane dissolved in 400 cc. of diethyl ether. The mixture was stirred for a period of about 4 hours after which time it was heated under reduced pressure to distill the ether and the ethyl alcohol formed during the hydrolysis reaction. The product was washed with water until neutral and then dried over anhydrous sodium sulphate. The product was then added to a flask and heated under reduced pressure to distill any residual ether or alcohol content therein. There was obtained 68 grams of a colorless oil. The oil was then placed in a flask connected to a Vigreux column and heated to its boiling temperature. There was distilled 49 grams of the cyclic tetramer of beta-cyanoethylmethylsiloxane which was identified by elemental analysis as well as by infra-red analysis. Infra-red analysis of the product remaining in the flask resulted in the identification of the cyclic pentamer, hexamer and heptamer of beta-cyanoethylmethylsiloxane.

The cyclic tetramer of beta-cyanoethylmethylsiloxane has a boiling temperature of 277 to 280° C. under a reduced pressure of 0.2 mm. Hg and a refractive index $n_D^{25}$ of 1.4580. The values appearing below were obtained from the elemental analysis of the compound and are compared with the corresponding calculated values.

| | Cyclic Tetramer of Beta-cyanoethylmethylsiloxane | |
|---|---|---|
| | Found | Calculated |
| Carbon, percent by weight | 42.6 | 42.3 |
| Hydrogen, percent by weight | 6.0 | 6.14 |
| Silicon, percent by weight | 23.9 | 24.5 |
| Nitrogen, percent by weight | 12.1 | 12.3 |
| Molecular weight | 474 | 456 |

*Example XXI*

To a beaker containing 400 cc. of cracked ice and 100 cc. of diethyl ether was added, while stirring the mixture, 15.46 grams of beta-cyanoethyltrichlorosilane dissolved in 10 cc. of diethyl ether. During the addition of the solution of beta-cyanoethyltrichlorosilane hydrogen chloride was evolved. After the addition, the beaker was allowed to stand overnight during which time the diethyl ether evaporated and a thick syrup formed on the bottom of the beaker. The syrup was removed from the beaker, washed with distilled water until neutral and then desolvate under reduced pressure at a temperature of 25° C. for a period of 160 hours. There was obtained 8.08 grams of beta-cyanoethylpolysiloxane $$[(NCCH_2CH_2SiO_{3/2})]$$

Beta-cyanoethylpolysiloxane was identified by infra-red analysis and by elemental content. The table below contains the values obtained from our analysis as well as the corresponding calculated values.

|  | [NCCH$_2$CH$_2$SiO$_{3/2}$] | |
| --- | --- | --- |
|  | Found | Calculated |
| Carbon, percent by weight | 29.7 | 33.9 |
| Hydrogen, percent by weight | 3.9 | 3.8 |
| Silicon, percent by weight | 25.0 | 26.4 |
| Nitrogen, percent by weight | 12.4 | 13.2 |

*Example XXII*

A sample of the beta-cyanoethylpolysiloxane prepared in the previous example was placed in a weighing bottle and the bottle placed in a forced draft air oven maintained at a temperature of 250° C. for a period of 96 hours. The weighing bottle was then removed from the oven and the polymer analyzed to determine the extent of decomposition caused by the elevated temperature. A variation in the elemental content of the polymer before and after heating is an indication of the extent of decomposition. In the sample tested, the beta-cyanoethylpolysiloxane had a carbon content of 29.7 percent by weight before heating and a carbon content of 26.3 percent by weight after heating. Such values indicate that our beta-cyanoethylpolysiloxane retains 88.3 percent of its carbon content at elevated temperatures, which makes the polymers desirable as a protective coating.

What is claimed is:

1. A process for reacting a silane, represented by the formula:

$$H-\underset{\underset{X_{(3-n)}}{|}}{Si}-R^0{}_{(n)}$$

where $R^0$ represents a member of the group consisting of hydrogen and a hydrocarbyl group, X represents a hydrolyzable group and $n$ represents a whole number having a value of from 0 to 2, with a mono-olefinic nitrile to produce a cyanoalkylsilane by the addition of a silyl group to the olefinic carbon atom of said mono-olefinic nitrile further removed from the cyano group thereof and by the addition of a hydrogen atom to the olefinic carbon atom of said mono-olefinic nitrile closer to the cyano group thereof which comprises forming a mixture of said silane, said mono-olefinic nitrile, and a tri-hydrocarbyl substituted hydride of bismuth, heating said mixture to a temperature sufficiently elevated to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile.

2. A process for reacting a silane, represented by the formula:

$$H-\underset{\underset{X_{(3-n)}}{|}}{Si}-R^0{}_{(n)}$$

where $R^0$ represents a member of the group consisting of hydrogen and a hydrocarbyl group, X represents a hydrolyzable group and $n$ represents a whole number having a value of from 0 to 2, with a mono-olefinic nitrile to produce a cyanoalkylsilane by the addition of a silyl group to the olefinic carbon atom of said mono-olefinic nitrile further removed from the cyano group thereof and by the addition of a hydrogen atom to the olefinic carbon atom of said mono-olefinic nitrile closer to the cyano group thereof which comprises forming a mixture of said silane, said mono-olefinic nitrile, and a tri-hydrocarbyl substituted hydride of antimony, heating said mixture to a temperature sufficiently elevated to cause said silane and nitrile to react to produce a cyanoalkylsilane by the addition of a silyl group to the olefinic carbon atom further removed from the cyano group of the starting nitrile and by the addition of a hydrogen atom to the olefinic carbon atom closer to the cyano group of the starting nitrile.

3. A process for producing a beta-cyanoethylsilane which comprises forming a mixture comprising a silane of the formula:

$$H-\underset{\underset{X_{(3-n)}}{|}}{Si}-R^0{}_n$$

where $R^0$ represents a member of the group consisting of hydrogen and a hydrocarbyl group, X represents a hydrolyzable group taken from the class consisting of a chlorine atom and an alkoxy group and $n$ represents a whole number having a value of from 0 to 2, acrylonitrile and a trialkylstibine catalyst, heating said mixture to a temperature sufficiently elevated to cause said silane and acrylonitrile to react to produce a beta-cyanoethylsilane.

4. A process for producing a beta-cyanoethylsilane which comprises forming a mixture comprising a silane of the formula:

$$H-\underset{\underset{X_{(3-n)}}{|}}{Si}-R^0{}_{(n)}$$

where $R^0$ represents a member of the group consisting of hydrogen and a hydrocarbyl group, X represents a hydrolyzable group taken from the class consisting of a chlorine atom and an alkoxy group and $n$ represents a whole number having a value of from 0 to 2, acrylonitrile and a triarylstibine catalyst, heating said mixture to a temperature sufficiently elevated to cause said silane and acrylonitrile to react to produce a beta-cyanoethylsilane.

5. A process for producing a beta-cyanoethylsilane which comprises forming a mixture comprising a silane of the formula:

$$H-\underset{\underset{X_{(3-n)}}{|}}{Si}-R^0{}_{(n)}$$

where $R^0$ represents a member of the group consisting of hydrogen and a hydrocarbyl group, X represents a hydrolyzable group taken from the class consisting of a chlorine atom and an alkoxy group and $n$ represents a whole number having a value of from 0 to 2, acrylonitrile and a trialkylbismuthine catalyst, heating said mixture to a temperature sufficiently elevated to cause said silane and acrylonitrile to react to produce a beta-cyanoethylsilane.

6. A process for producing a beta-cyanoethylsilane which comprises forming a mixture comprising a silane of the formula:

$$H-\underset{\underset{X_{(3-n)}}{|}}{Si}-R^0{}_{(n)}$$

where $R^0$ represents a member of the group consisting of hydrogen and a hydrocarbyl group, X represents a hydrolyzable group taken from the class consisting of a chlorine atom and an alkoxy group and $n$ represents a whole number having a value of from 0 to 2, acrylonitrile and a triarylbismuthine catalyst, heating said mixture to a temperature sufficiently elevated to cause said silane and acrylonitrile to react to produce a beta-cyanoethylsilane.

7. A beta-cyanoethylpolysiloxane of the formula:

$$[NCCH_2CH_2\text{---}SiO_{3/2}]_w$$

where $w$ is a whole number having a value of at least 4.

References Cited by the Examiner

UNITED STATES PATENTS

| | | | |
|---|---|---|---|
| 2,557,802 | 6/1951 | Sommer | 260—448.2 |
| 2,561,429 | 7/1951 | Sveda | 260—448.2 |
| 2,637,738 | 5/1953 | Wagner | 260—448.2 |
| 2,701,803 | 2/1955 | Orkin | 260—448.8 |
| 2,721,873 | 10/1955 | MacKenzie et al. | 260—448.2 |
| 2,776,306 | 1/1957 | Cole | 260—448.2 |
| 2,907,784 | 10/1959 | Jex et al. | 260—448.2 |
| 2,911,426 | 11/1959 | Jex et al. | 260—448.2 |
| 3,099,670 | 7/1963 | Prober | 260—448.2 |

FOREIGN PATENTS 961,878  11/1949  France.

OTHER REFERENCES

Hauser et al., "Jour. Am. Chem. Soc.," vol. 74 (1952), p. 5091–6.

Petrov et al., Doklady Akad. Nauk. SSSR, vol. 100, No. 4, February 1955, pages 711–714.

Prober, "Jour. Am. Chem. Soc.," vol. 77 (June 1955), p. 3224–8.

Rochow, "An Introduction to the Chemistry of the Silicones" (1951), J. Wiley and Sons, Inc., New York, publishers, page 81.

TOBIAS E. LEVOW, *Primary Examiner.*

EARL W. HUTCHISON, ALLAN M. BOETTCHER, *Examiners.*

S. H. BLECH, E. C. BARTLETT, J. G. LEVITT, *Assistant Examiners.*